United States Patent [19]
Keller

[11] 4,105,360
[45] Aug. 8, 1978

[54] DUAL CUT BORING TOOL ASSEMBLY

[75] Inventor: Dale L. Keller, Gettysburg, Pa.

[73] Assignee: R. H. Sheppard Co., Inc., Hanover, Pa.

[21] Appl. No.: 804,801

[22] Filed: Jun. 8, 1977

[51] Int. Cl.$^2$ .......................... B23B 39/16; B23G 1/20
[52] U.S. Cl. ...................................... 408/118; 408/36; 408/148; 408/187; 408/714
[58] Field of Search .................. 408/28, 36, 118, 119, 408/146, 148, 151, 154, 156, 180, 187, 188, 714

[56] References Cited

U.S. PATENT DOCUMENTS

| | | | |
|---|---|---|---|
| 2,735,485 | 2/1956 | Metcalf | 408/119 X |
| 2,815,688 | 12/1957 | Forbes et al. | 408/118 X |

*Primary Examiner*—Travis S. McGehee
*Attorney, Agent, or Firm*—Lowe, King, Price & Markva

[57] ABSTRACT

A boring tool assembly performs both the rough and finish cutting operations upon a metal work piece without power activation or manual adjustments of the tool units between the cutting strokes. The assembly includes a boring bar having a pair of fixed, diametrically opposed rough cut tool units, and a pair of retractable finish tool units diametrically opposed to each other also. The tool units are automatically operative in response to either the rough cut or the finish cut of the boring tool assembly. Spring biased plungers normally pivot the finish cutting units toward their cutting positions. During the initial or rough cutting operation, forces act upon the heel of the finish tools causing retraction from the cutting position. This is possible due to the cutting edge configuration and angle of orientation of the tools, the positioning of the tools on the trailing side of the boring bar centerline, and the direction of advancement of the boring bar. When the rough cut has been completed, the finish tool units are forced to their outer cutting position across the center line of the bar and the reverse feeding of the tool assembly back through the work piece completes the dual cutting operation. The reverse direction of movement of the tool, the positioning of the cutting tip on the leading side of the center line, and the angle of orientation, preferably (10°) to the axis of the boring bar, combine to effectively lock the finish tool units in position for efficient performance of the finish cut. Both the rough and finish tools are securely held in mounting blocks and adjustment of both is provided.

20 Claims, 10 Drawing Figures

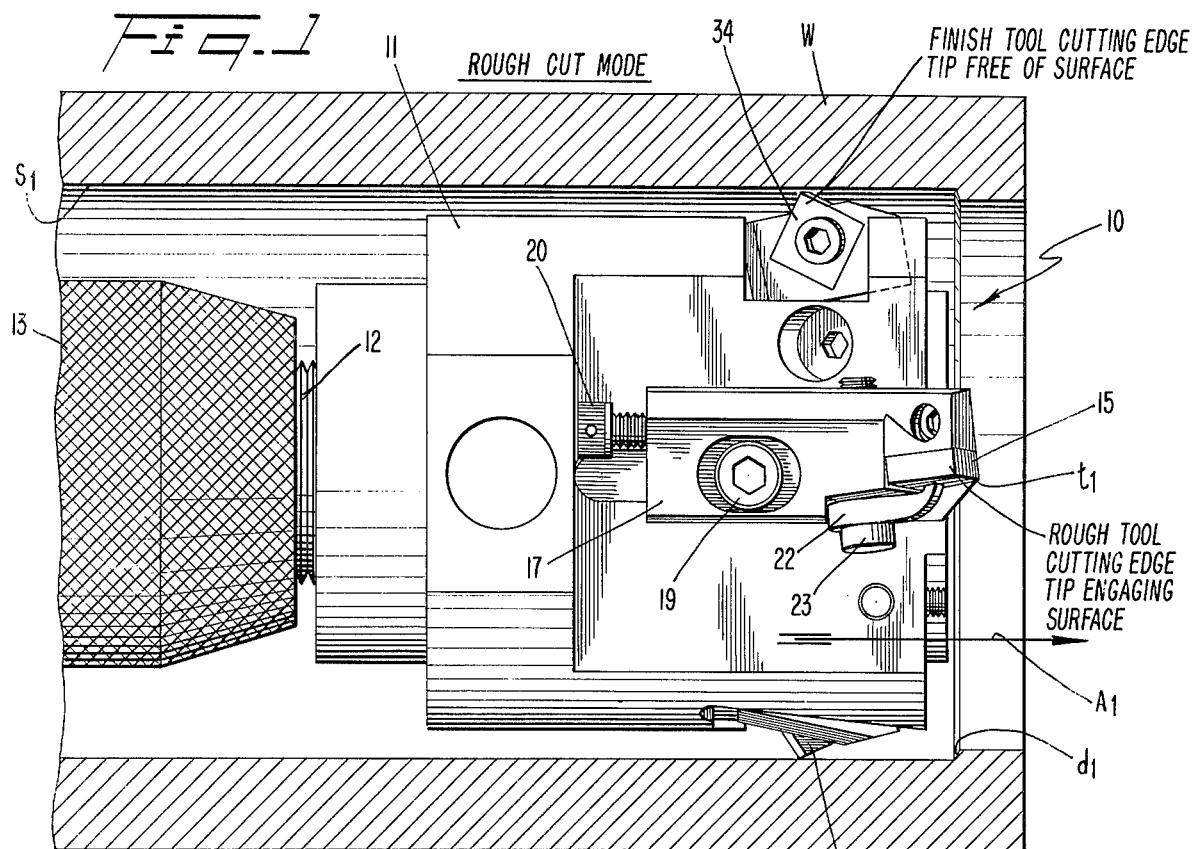
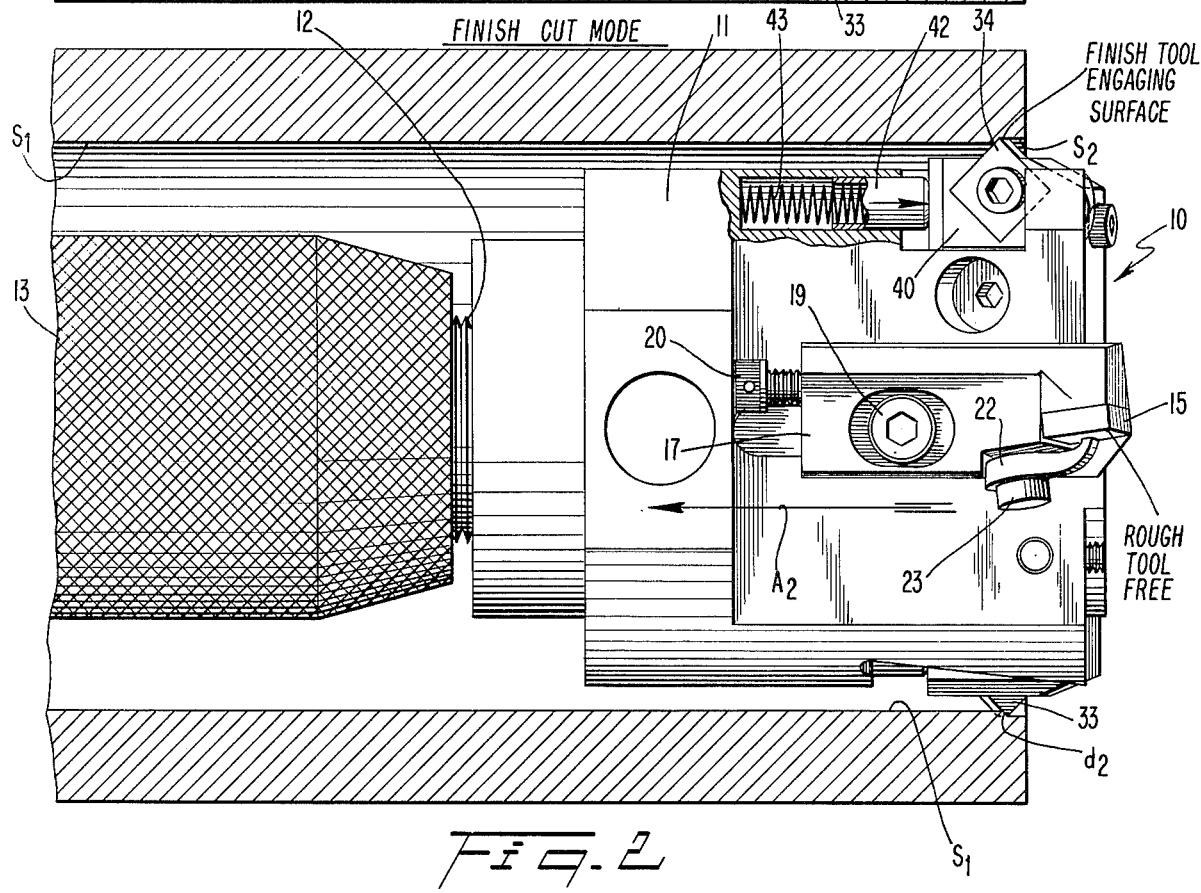

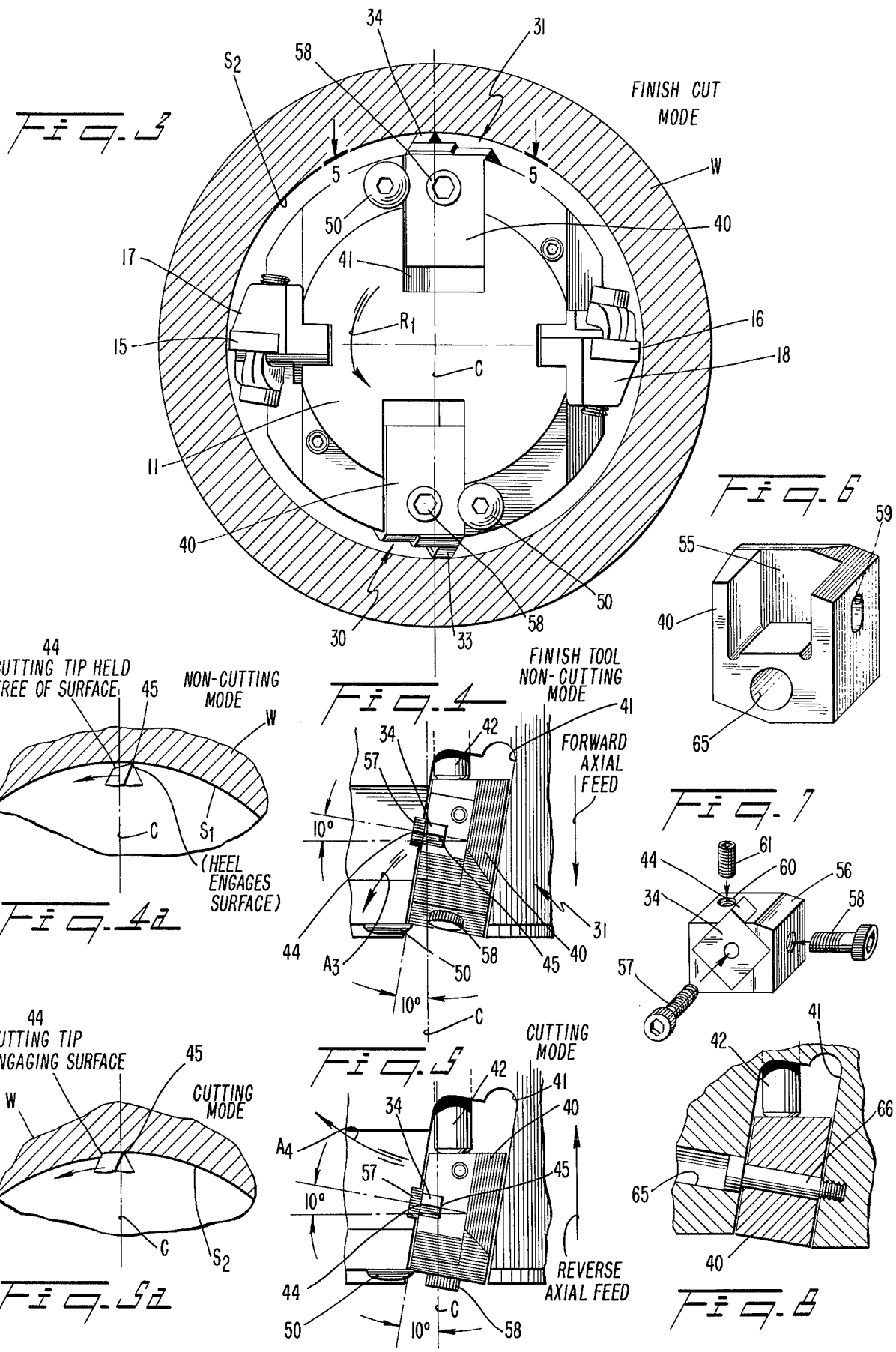

DUAL CUT BORING TOOL ASSEMBLY

BACKGROUND OF THE INVENTION

The present invention relates to metal cutting, and more particularly, to a boring tool for performing both the rough and finish cutting operations.

In the production of metal parts having a bore, it is often necessary to perform a rough boring operation to remove a substantial thickness of metal, followed by a finish cutting operation removing a small thickness of metal to maximize the smoothness of the surface. It is general practice in the machining art to perform the rough cut on the work piece with one tool, and then use a different tool for the finish cutting operation. In doing this, it is then at least necessary to carry out these separate steps: (1) perform the rough cut; (2) retract the rough cut tool as the boring bar reverses its direction and moves back through the bore that has been formed; (3) remove the tool and reset the machine; (4) perform the finish cut; and (5) retract and reverse feed the finish cut tool. The entire operation is time-consuming and inefficient.

In an attempt to make the operation more efficient, some machine shops prefer to have one machine perform the rough cut and a second machine perform the finish cut. However, as will be recognized, this still falls far short of an operation that is efficient in terms of motion and time.

There have been attempts to provide a boring bar to provide both the rough cut and the finish cut operation. These previous attempts may be exemplified by the U.S. Pat. to Briney, et al., No. 3,233,480, issued Feb. 8, 1966. In this prior patent, the boring bar utilizes a complicated set of centrifugal clutches and actuating mechanisms to provide two cutting depths. A separate actuator mechanism is required to shift the single cutter radially outwardly in order to provide the finish cut. The shifting is controlled by a plurality of concentric rotatable discs and it has been found in practice that the shifting movement is unstable and inaccurate so that the finish cut leaves much to be desired. Furthermore, because a separate actuation is required, the speed of the boring bar is limited, and in fact relatively time-consuming.

In another type of tool that has been proposed, a boring tool is provided having dual cutters and a retractable tool to deburr the entrance and exit to the bored hole. The retractable tool does not perform any cutting function on the inside of the work piece and thus is not capable of performing both the rough and the finished boring operations. This type of tool is shown by the Busch U.S. Pat. No. 2,878,696, issued May 24, 1959.

Contrary to the previous attempts in this art, I have recognized a need for a dual cut boring tool assembly that is simple in design and requires no special operation during the machining cycle in order to activate or deactivate the cutting tools. I have set out to provide a tool assembly that will inherently perform both the rough cut and the finish cut simply by positioning the tools in the proper cutting relationship at the proper time during the cycle.

OBJECTIVES OF THE INVENTION

Thus, it is one object of the present invention to provide a cutting tool assembly for a metal work piece in which the rough cut is performed in one direction of travel of the work piece, and the finish cut is performed in the opposite direction of feed without any controlled activation of the tool units.

It is another object of the present invention to provide a tool assembly for performing both rough and finish cutting operations that depend on the retraction of the finish tool as a result of a retracting force acting against the heel of the finish tool.

It is still another object of the present invention to provide a tool assembly of the type described for boring a hole in a work piece in which a retractable finish tool unit is provided with the rotational positioning and lead angle orientation of the cutting edge of the tool providing selective finish cutting and rigid positioning of the tool during the finish cutting operation.

It is still another object of the present invention to provide a dual cut tool assembly in which both the rough cut tools and the retractable finish cut tools are adjustable in order to provide accurate machining of a work piece.

SUMMARY OF THE INVENTION

In order to obtain the above objectives, I have provided a pair of fixed rough cut tool units and pair of retractable finish tool units positioned on a boring bar. The tool units are inherently in the proper position during cutting to perform the rough cut and the finish cut, one immediately after the other while the boring bar continues to rotate in a single direction. The finish cut is actually advantageously performed as the boring bar is axially moved in the reverse direction through the work piece. Although the invention is described herein as relating to a boring operation, it is contemplated that other operations, for example lathe work, could succesfully use the same tool positioning concepts to advantage.

According to the invention, the finish cut tools are mounted on pivotal mounting blocks and are spring biased outwardly toward their cutting positions. The finish cut tools are uniquely positioned so that during the inital or rough cutting operation the cutting tip of the tools do not engage the internal curved surface of the hole being formed. Instead, the entire finish cutter is retracted into the boring bar. The cutting edge of the tool is shifted in the direction of relative rotation across the center line of the boring bar to assure that only the heel of the tool engages the inner curved surface. During this operation, the cutting tip of the edge is adjacent the center line and spaced downwardly away from the curved surface of the work piece.

The cutting edge of the tool has sufficient width to assure that either the heel or the tip engages the surface of the work piece, but not both at the same time when in the offcenter positions described. During the finish cutting operation, the tool shifts back across the center line causing the cutting tool to engage the surface.

The lead angle of orientation and reverse direction of feed of the finish cutting tool provides the proper engagement with the metal surface during the finish cutting operation. With the lead angle of preferably approximately 10° the finish cutters are effectively locked in position for efficient performance of the final cut. Both the rough and finish tools are securely held in mounting blocks and adjustments are provided as necessary for efficient operation of both tools.

In the preferred embodiment, the rough cut tool units are operatively set in diametrically opposed pairs of units for maximum cutting efficiency. Likewise, the finish cutter units are provided preferably in pairs to enhance the cutting efficiency.

BRIEF DESCRIPTION OF THE DRAWINGS

FIG. 1 is a side view of the boring tool assembly shown in operation providing the rough cut of a bore in a metal workpiece;

FIG. 2 is a side view like that of FIG. 1 but showing the boring tool assembly in the finish cut mode of operation;

FIG. 3 is an end view of the boring tool and workpiece looking in from the right end of FIG. 2 and showing the finish cut tools in operative engagement;

FIG. 4 is a top view of the finish tool unit in the noncutting mode of operation with engagement of the surface being denoted on the heel of the cutting tool;

FIG. 5 is a top view of the finish tool unit in the cutting mode (line 5—5 of FIG. 3), with the finish tool positioned to operatively engage the curved surface of the work piece;

FIGS. 4a and 5a are corresponding cutaway front views of FIGS. 4 and 5, respectively, showing in enlarged perspective the finish tool with the cutting tip held free of the surface for noncutting and the cutting tip engaging the surface for cutting;

FIG. 6 is a detailed perspective view of the pivotal mounting block of the finish tool unit;

FIG. 7 is a detailed, enlarged view of the cutter tool and holder that is to be positioned in the pivotal mounting block in FIG. 6; and FIG. 8 is a detailed cross-sectional view taken through the finish tool unit showing the mounting of the pivotal mounting block.

The advantage of the present invention will become apparent to those skilled in this art from the following detailed description, wherein I have described only the preferred embodiment of the invention, simply by way of illustration of the best mode contemplated by me of carrying out my invention. As will be realized, the invention is capable of other and different embodiments, and its several details are capable of modification in various obvious respects, all without departing from the invention. Accordingly, the drawings and description are to be regarded as illustrative in nature, and not as restrictive.

DESCRIPTION OF THE PREFERRED EMBODIMENT

With reference now to FIGS. 1 and 2 of the drawings, a boring bar assembly, generally designated by the reference numeral 10, has been illustrated in order to show the salient features of the present invention. The boring bar assembly 10 is shown working in a metal workpiece W forming a bore having an internal curved surface. The curved surface formed by the rough cut of the boring bar assembly 10 has been denoted as $S_1$ in FIGS. 1 and 2, and the start of the finish cut surface $S_2$ has been shown in FIG. 2.

The boring bar assembly 10 includes a boring bar 11 forming in effect the body of the assembly with a threaded end 12 suitably carried by a chuck 13 of the machine tool (not shown).

The rough cut operation is performed by two diametrically opposed tools 15, 16 (see also FIG. 3) carried on the boring bar 11 by suitable adjustable mounting blocks 17, 18, respectively. The mounting blocks 17, 18 are identical and are held in position on the boring bar by a clamp screw 19 extending through a slot into the boring bar. A jack screw 20 is provided at the rear of the blocks 17, 18 in order to provide axial adjustment of the mounting blocks and thus the rough cutting tools 15, 16. The tools are adjusted in order to perform the rough cutting operation, which is of substantial depth as shown by indicia $d_1$ in FIG. 1.

The tool is in the form of a cutter having four cutting edge tips; the operative cutting edge tip being denoted by indicia $t_1$ in FIG. 1. As each tip $t_1$ is worn, the tool 15, 16 can be removed and rotated to a new tip by loosening clamp 22 held on the block 17, 18 by the screw 23.

As will be apparent, the rough cut tool 15, 16 performed the cutting operation at $d_1$ as the boring bar 11 is moved in the forward axial direction, as denoted by a feed arrow A1. As the boring bar moved forward, the tip $t_1$ engages the inner curved surface $S_1$ and effectively machines the surface in an efficient manner. The block 17 is held securely by the clamping screw 19 and adjusted by the jack screw 20. This is the first operation of finishing a bore in the workpiece W. When the rough cut tools 15, 16 emerge from the bore formed by the surface $S_1$, this first part of the machining operation is complete. FIG. 2 shows the rough cut tool 15 outside the bore, and with the finish cut mode already begun to form the finished surface $S_2$ by making a lesser depth cut $d_2$, as will now be described.

In accordance with the present invention, there are provided two diametrically opposed finish tool units, generally represented by the reference numeral 30, 31. These two finish tool units are identical and they employ a cutting tool 33, 34 that has two distinct positions in the two modes of operation of the present invention.

In the rough cut mode, shown in FIG. 1, the tools 33, 34 are not engaged in cutting relationship with the internal bore surface $S_1$, but instead are retracted in accordance with the invention. However, on the return or reverse movement of the boring bar 11, exemplified by the motion arrow $A_2$ (FIG. 2), the tools 33, 34 are cutting and forming the finished surface $S_2$.

Note in FIG. 3 the finish cut tools 33, 34 are performing the cutting operation and the rough cut tools 15, 16 are spaced inwardly of the finished surface $S_2$.

Advantageously, the boring bar 11 rotates in the same direction both for the finish cut and the rough cut, as shown by the rotation direction arrow $R_1$ in FIG. 3. As will be seen below, the finish cut tools 33, 34 are simply spring biased outwardly and automatically engage the surface $S_2$ without having to be positively activated by any form of tripping mechanism, thereby making the boring bar assembly 10 of the present invention very simple, and accordingly highly desirable.

First, to explain the deactivation of finish tools 33, 34 during the rough cut mode (FIG. 1), reference can now be made of FIGS. 4 – 8 of the drawings. In these Figures, the tool 34 (tool 33 being identical and thus not necessary to describe) is mounted in a pivotal mounting block 40 in a slot 41 formed in the outer end of the boring bar 11. The slot 41 is cut into the boring bar 11 at a critical angle to the center axis of the tool, and as can best be seen in FIG. 4. This angle has been selected as 10° (note center axis C in FIGS. 3 and 4).

To constantly urge the mounting block 40 toward the position of the finish tool cutting mode, as shown in FIGS. 2, 3 and 5, a plunger 42 is provided extending into the rear of slot 41 and acting against the rear face of the pivotal mounting block 40. The plunger is constantly urged forward by a suitable spring 43 positioned in a mounting hole behind the plunger 42 (see FIG. 2).

The spring 43 is sufficiently strong to keep the tool 34 firmly urged toward the cutting position, but this force can be overcome by a countering depressing force that may operate against the trailing portion or heel of the tool 34, during the rough cut mode.

Thus, the tool 34 has an exposed edge defined by leading cutting tip 44 and trailing heel 45. A good view of these features can be seen in the enlarged breakaway view of FIGS. 4 and 4a.

In the noncutting mode of operation of the boring tool assembly of the present invention, the heel 45 is engaging the inner curved surface $S_1$ of the workpiece W, and is thus harmlessly sliding over the surface because of this engagement. This engagement is a factor of the combined off-center positioning and the rotational ($R_1$) and forward axial ($A_1$) feed, that is shown by composite arrow $A_3$ in FIG. 4.

The depressing pressure on the tool 34 is downward and toward the rear against the plunger 42 (see FIG. 4). The 10° angle provides the assurance that the cutting tip 44 is positioned in the noncutting mode adjacent the center axis C of the boring tool 11. To put it another way, the tool 34 is off-center with respect to the center axis of the tool assembly 10 and the workpiece W. Note FIG. 4, where the tool 34 has passed over center axis C toward the trailing heel 45 during the retraction of the unit 31. As can be seen in FIG. 4a, the curvature of the surface $S_2$ now causes a space to develop and be maintained between the cutting tip 44 and the surface $S_2$ adjacent the center axis C thereby holding the cutting tip 44 free and in the noncutting mode.

When the rough cut operation has been completed, the boring bar assembly including the finish tools 33, 34 emerge from the cylinder bore formed by the surface $S_1$. At this instant, the plunger 42 pivots the mounting block 40 outwardly and forwardly until the front edge hits the screw stop 50. In this position (FIG. 5) the tool 34 (as well as tool 33) is ready to perform the finish cut operation. It is critical in this position that the tool be held securely and free of any tendency to chatter or vibrate. In this respect, details of the mounting block 40 will now be described.

In FIG. 6, the perspective of the mounting block 40 shows the recess 55 in which tool holder 56 is designed to closely fit. The cutter tool 34 in turn fits within a recess in a tool holder 56 and is held in position by a screw 57. A clamping screw 58 in turn holds the holder 56 within the recess 55 by passing through a slotted aperture 59 in the block 40. Extending downwardly through the holder is a tapped opening 60 receiving a set screw 61 designed to engage the bottom of the recess 55. By adjustment of the screw 61, the radial position of the cutting tip 44 can be accurately set and once accurately set, can be locked in position by the screw 58.

The pivotal mounting of block 40 is accomplished by an aperture 65 mating with a shoulder screw 66 having a bearing fit therein (see FIG. 8). The screw 66 extending through the body of the boring bar 11 and the fit of the mounting block 40 within the slot 41 is very precise in order to provide the stable positioning function required to prevent any chatter or vibration of the finish cut during operation.

Accordingly, moving on to FIGS. 5 and 5a, the cutting mode of the finish tool 34 can now be explained. When the tool 34 is fully ejected outwardly, the cutting tip 44 is ready to be fed into engagement with the surface $S_1$ of the workpiece W as the boring bar 11 is reverse fed back along the axis of said workpiece. The composite feed, that is, the reverse axial feed, plus the rotational movement of the tool bar 11, is set forth by the arrow $A_4$. With this composite movement, the tip 44 moves into the surface $S_1$ and automatically begins to cut the finish cut to provide the surface $S_2$ in a highly efficient manner.

The upward and forward movement of the tool 34 has caused the tool to move across the center axis C (see FIG. 5a) and thus into a position where the cutting tip is biting into the surface for cutting. The reverse force on the holder 40 is directly against the side of the slot 41 opposite the tool 34 and this action securely holds the block 40 against any deleterious movement. The extended length of the pivot pin 66 in the form of a shoulder screw 66 has a precise bearing fit so that any chance of tool chatter is eliminated.

The selection of 10° as the lead angle for the tool 34 is based on the consideration of obtaining optimum engagement of both the heel 45 and the tip 44 with the inner surface $S_2$ of the workpiece W during the rough cut and the finish cut modes of operation, respectively. This angle is an especially important factor in assuring that the tip 44 is spaced free of the surface $S_2$ and the heel 45 maintained in positive sliding engagement (FIG. 4a) during the rough cut mode. Variations in this angle are possible depending on such parameters as the rate of feed movement, the width of the cutting edge of the tool and the degree of curvature of the machined surface.

In summary I have provided a boring bar assembly 10 that is capable of performing the dual functions of making both the rough and the finish cut in a highly successful manner. During the rough cut by the tools 15, 16 the finish cut tools 33, 34 are automatically retracted. These finish cut tools are held in the noncutting position by sliding engagement of the heel 45 with the curved surface, as best shown in FIG. 4a. Because the tool 34 has moved across the center axis C with the cutting tip adjacent to the center axis, the curved surface $S_2$ engages only at the heel 45, assuring that the cutting tip 44 is held free of the surface during this mode of operation. When the boring bar 11 emerges from the end of the bore, the plungers 42 urge the tools 33, 34 to their full outwardly extended positions. The axial movement of the boring bar 11 is reversed and the composite movement $A_4$ brings the cutting tip 44 into direct cutting engagement since the tool has now moved back across the center axis C (FIG. 5a). The heel 45 is now disengaged and is held free of engagement. There is no triggering mechanism required to switch from one mode to another and the finish cut is highly accurate and smooth, as is desired.

While the present invention has been illustrated by a detailed description of the preferred embodiment thereof, it will be obvious to those skilled in the art that various changes in form and detail can be made therein without departing from the true scope of the invention. For that reason, the invention must be measured by the claims appended hereto and not by the foregoing preferred embodiment.

What is claimed is:

1. A tool assembly for performing rough and finish cutting operations on a workpiece having a curved surface by relative movement therewith comprising a tool support bar, first cutter means mounted on said tool bar for performing a rough cut along the curved surface, second cutter means mounted on said tool bar for performing a finish cutting operation along said curved surface, and means movably mounting said second cutter means for positioning said second cutter means alternately in a noncutting position during the rough cutting operation performed by the first cutter means and in a cutting position during the finish cutting operation.

2. The cutting tool assembly as set forth in claim 1 wherein said second cutter means includes a pivotal mounting block for the cutting tool and biasing means for positioning said mounting block so as to cause engagement with said curved surface in a noncutting position in the rough cutting mode of operation and in a cutting position in the finish cut mode of operation.

3. The cutting tool assembly as set forth in claim 2 wherein said mounting block for said second cutter means is positioned to provide an acute lead angle for said cutting tool with respect to said workpiece, said cutting tool of said second cutter means having an edge with a leading cutting tip positioned adjacent the center axis of the tool assembly and a trailing heel in sliding engagement with said curved surface spaced rearward of said center axis during the noncutting mode, whereby the curved surface engages the heel of said cutter to hold the tip free of said surface.

4. The cutting tool assembly of claim 3 wherein the cutting tip is positioned forward of the center axis of the tool during the cutting mode with the heel being positioned adjacent the cecter axis so that the cutting tip engages the curved surface being cut.

5. The cutting tool assembly of claim 4 wherein the lead angle of the cutting tool of said second cutter means with respect to the center axis is approximately 10°.

6. The cutting tool assembly of claim 5 wherein the cutting edge of the second cutter means is substantially straight and has sufficient width to assure engagement with said curved surface of only one of said tip and heel during each of said cutting operations.

7. The cutting tool assembly of claim 3 wherein said support bar includes a slot for said mounting block at an acute angle with respect to the center axis of the tool assembly, and said biasing means includes a plunger in communication with said slot and engaging said mounting block and spring means urging said plunger so as to position the cutting tool toward the cutting position.

8. The cutting tool assembly of claim 7 wherein is provided stop means to limit the movement of said mounting block as it is moved in response to said biasing means.

9. The cutting tool assembly of claim 7 wherein said mounting block is pivotally mounted by a pivot pin extending laterally across said block, said pin having a close bearing fit with respect to said block to provide a secure mounting for said cutting tool of said second cutter means.

10. The cutting tool assembly of claim 7 wherein is further provided a holder for the cutting tool, said holder being positioned in a close fitting recess within said pivotal mounting block, an adjustable set screw to adjustably position the holder within the mounting block to radially position the tip of the cutting tool, and a clamping screw to securely position said holder within said block.

11. A metal cutting tool assembly for machining a curved metal surface by relative movement therewith comprising a cutter having a cutting edge with a leading tip and a trailing heel, the cutting edge defining the thickness of said cutter extending between the tip and the heel, the thickness of said cutter being sufficient to allow engagement of either the leading tip or the trailing heel in a cutting and noncutting mode, respectively, but not both on said curved surface when positioned off-center with respect to said tool, and means for positioning said cutter in two off-center positions with respect to the cutting tool, whereby in one position a cutting operation is performed by the tip and in the other position a sliding engagement with said heel positions the tip in a noncutting position.

12. The metal cutting tool of claim 11 wherein said edge in the cutting mode extends at a lead angle and substantially in the direction of the relative movement to direct the cutting tip into the curved surface for efficient cutting action.

13. The metal cutting tool of claim 12 wherein said lead angle of the cutting edge is approximately 10°.

14. The metal cutting tool of claim 13 wherein said positioning means includes a mounting block positioned for pivotal movement and biasing means for urging the block to a position toward the cutting position of the tool.

15. A boring tool assembly for cutting a circular bore in a metal workpiece during both forward and rearward axial movement in the bore comprising a tool support bar, first cutter means mounted on said tool bar for performing a rough cut along the curved surface during the forward movement of the tool assembly through the bore, second cutter means mounted on said tool bar having a leading cutting tip and a trailing heel for performing a finish cutting operation along the bore during the reverse movement of the tool assembly, said second cutter means being positioned off-center with respect to central axis of the tool assembly in the noncutting mode to provide engagment between the curved surface and the heel of the cutting tool, and the second cutter means being positioned off-center in the opposite direction in the cutting mode to provide engagement of the cutting tip with the surface of the bore, whereby the cutting tip is held out of engagement with the surface during the forward movement through the bore and is held in cutting engagement with the surface during the rearward movement through the bore.

16. The cutting tool assembly of claim 15 wherein the tool of said second cutter means includes an edge extending between the cutting tip and the heel, the length of said edge being sufficient to allow engagement of either the leading tip or the trailing heel in a cutting and noncutting mode, respectively, but not both on said curved surface when the tool is positioned off-center with respect to the center axis of said bar.

17. The cutting tool assembly as set forth in claim 16 wherein said first cutter means provides a rough cut, said first cutter means including a pair of fixed cutting tools, mounting blocks for holding said fixed cutting tools and means for axially adjusting the position of said blocks.

18. The cutting tool assembly as set forth in claim 16 wherein said second cutter means extends at an approximately 10° lead angle in its cutting mode.

19. The cutting tool assembly as set forth in claim 15 wherein is provided adjustment means for said first and second cutter means.

20. The cutting tool assembly as set forth in claim 15 wherein said second cutter means is mounted in a pivotal mounting block and biasing means acting on said block to urge said second cutter means toward its cutting position.

* * * * *